United States Patent [19]

Noeth et al.

[11] Patent Number: 5,274,578
[45] Date of Patent: Dec. 28, 1993

[54] CIRCUIT AND METHOD FOR NORMALIZING DETECTOR CIRCUIT

[75] Inventors: Jon C. Noeth, Garland; James E. Robertson, Denton; Terry L. Zumwalt; Glenn T. Mortland, both of Garland; David O. Box, McKinney, all of Tex.

[73] Assignee: Texas Instruments Incorporated, Dallas, Tex.

[21] Appl. No.: 850,255

[22] Filed: Mar. 12, 1992

Related U.S. Application Data

[63] Continuation of Ser. No. 444,184, Nov. 30, 1989, abandoned.

[51] Int. Cl.$^5$ .............................................. G06F 15/31
[52] U.S. Cl. ................................. 364/582; 364/571.02
[58] Field of Search ........... 364/582, 575, 574, 571.02, 364/571.04, 571.01, 572, 557; 358/113; 250/330, 332, 334

[56] References Cited

U.S. PATENT DOCUMENTS

| | | | |
|---|---|---|---|
| 3,845,288 | 10/1974 | Cornyn, Jr. et al. | 364/582 |
| 4,135,248 | 1/1979 | Bluzer | 364/575 |
| 4,298,887 | 11/1981 | Rode | 358/113 |
| 4,573,133 | 2/1986 | White | 364/571.04 |
| 4,680,723 | 7/1987 | Whinray et al. | 250/332 |
| 4,719,350 | 1/1988 | Alm | 250/330 |
| 4,729,110 | 3/1988 | Welles, II et al. | 364/571.02 |
| 4,868,389 | 9/1989 | Moore | 250/334 |
| 4,948,964 | 8/1990 | Gohlke | 250/334 |
| 4,965,448 | 10/1990 | Morse et al. | 250/334 |
| 4,967,082 | 10/1990 | Cooke et al. | 250/332 |

FOREIGN PATENT DOCUMENTS

57-172206 10/1982 Japan.
1549168 8/1976 United Kingdom.
2149260 6/1985 United Kingdom.

Primary Examiner—Thomas G. Black
Assistant Examiner—Michael Zanelli
Attorney, Agent, or Firm—Rene' E. Grossman; Richard L. Donaldson

[57] ABSTRACT

A dynamic detector normalization circuit for normalizing detector output data using detector-error-correcting offset and gain coefficients that are updated in real time. The offset/gain coefficients are computed by a coefficient processor (20) at selected update intervals based on detector responses to a reference source. The coefficient processor averages detector reference responses over a number of update intervals to obtain updated offset/gain coefficients with greater precision than that available from the detector network. The detector normalization circuit (10) includes offset addition logic (12) and gain coefficient logic (14) for reading-out the offset/gain coefficients stored in respective RAMs (13, 15). For each detector output sample received by the detector normalization circuit (10), an offset addition operation 40 adds to the sample the MS bits of the offset coefficient. After the addition operation, the LS bits of the offset coefficient (representing increased precision available from the offset coefficient) are concatenated, and after underflow/overflow protection (42), an offset-corrected detector sample is obtained. A gain multiplication operation (50) multiplies the offset-corrected detector sample by the gain coefficient to obtain an offset/gain-corrected detector sample. After discarding LS bits representing unnecessary precision, and range-clipping (60), the normalization circuit (10) outputs normalized detector data with the desired precision. The detector normalization technique is described in connection with an exemplary application for normalizing thermal detector array output in a thermal imaging system.

18 Claims, 2 Drawing Sheets

CIRCUIT AND METHOD FOR NORMALIZING DETECTOR CIRCUIT

RELATED APPLICATIONS

This application is a continuation of application Ser. No. 07/444,184 filed Nov. 30, 1989, entitled "Circuit and Method for Normalizing Detector Circuit" by Jon Carl Noeth, James E. Robertson, Terry Lee Zumwalt, Glenn Timothy Mortland and David Oliver Box, now abandoned.

TECHNICAL FIELD OF THE INVENTION

This invention relates in general to systems for processing data from detector networks, and more particularly to a normalization circuit and method for normalizing the data output from a detector.

BACKGROUND OF THE INVENTION

In signal processing applications that use detector networks for data input, a common problem is random detector output errors that affect the reliability of detector data input to the processing system. Detector output over time is affected by such factors as operating environment, structural materials and fabrication processes. Resulting detector output errors tend to be nonuniform, and even more problematic, tend to change unpredictably with changes in operating environment and duty cycle.

An example of a system that processes data generated by a detector network is a thermal imaging system, which includes a thermal detection subsystem with a network of thermal radiation detectors (such as a focal plane array). The detector array is typically scanned across the image scene, and incident thermal radiation is gathered by the detectors and converted by the thermal detection subsystem into digital detector output samples that comprise the pixels (picture elements) of the image scene. Because of nonuniformities in both structural materials and fabrication processes, the detector-to-detector response to a given level of incident thermal radiation is nonuniform.

The conventional approach to increasing the accuracy of detector output data is to calibrate detector response by calibrating, and periodically recalibrating, the detector network. While the signal processing system is off-line, a reference is introduced—such as a thermal reference source in the case of the exemplary thermal imaging system—and the response of each detector in the detector network to the reference is recorded. From these detector reference responses, a detector calibration error representative of deviation in detector reference response from the ideal can be computed for each detector of the detector network, and used during on-line processing to correct detector output.

While the calibration correction for each detector will be different because of nonuniformities in detector-to-detector response to the reference, the reference output error for each detector can be characterized by a first order linear function $m(x+b)$, where m is a gain factor, and b is an offset level. That is, for each detector, detector response to a reference can be used to compute calibration gain (m) and offset (b) coefficients for correcting detector output. These calibration coefficients are then used to correct detector output errors during on-line operation.

A problem with this calibration approach is that detector output changes unpredictably as a function of time and operating environment. As a result, the calibration coefficients computed during a calibration procedure become less representative of actual detector output errors, and therefore, less able to provide adequate compensation. Thus, while regular recalibration can be used to compensate for static performance deviations (such as caused by structural changes or materials degradation), achieving continuously accurate data from a periodically recalibrated detector network is made problematic by dynamic operational nonuniformities in detector response.

An additional problem with detector output accuracy is the limit on precision conventionally obtainable from detector networks. That is, even without the problem of detector output errors due to dynamic nonuniform changes in detector performance, many conventional detector networks can not provide data with the level of precision that the associated signal processing systems are capable of handling. This limit on the precision of detector data output effectively limits signal processing accuracy and flexibility.

In the case of the exemplary thermal imaging system, current thermal detector technology typically limits precision to 12 bits—beyond that level, detector noise resulting from random nonlinearities and nonuniformities become significant in terms of limiting the precision of the detector output signal. However, these thermal imaging systems typically incorporate the image processing capability to handle at least 16-bit precision.

Accordingly, a need exists for a detector normalization circuit that normalizes detector output using dynamically updated gain and offset normalization coefficients, maintaining detector output accuracy over a relatively long period of time under a variety of operating conditions. Preferably, such a detector normalization system would provide means to increase the precision of the detector output data.

SUMMARY OF THE INVENTION

The present invention is a dynamic detector normalization circuit and method that normalizes detector output using normalization (gain and offset) coefficients that are updated in real time, both for correcting detector output errors, and for providing greater detector output precision.

In one aspect of the invention, a normalization system receives detector output data from a detector network. At selected intervals, the detector network is caused to sample a reference source, providing a detector reference response for each detector. For each such interval, a coefficient processor is responsive to the detector reference responses to generate correspondingly updated gain and offset normalization coefficients for each detector.

In synchronism with the receipt of detector output data, offset addition logic adds to the detector data the corresponding offset normalization coefficients, while gain multiplication logic multiplies the detector data by the corresponding gain normalization coefficients. As a result, the detector data is normalized according to the normalization function represented by the offset and gain normalization coefficients.

Preferably, the coefficient processor processes an arbitrary number of detector reference responses for each detector to reduce signal noise. Taking advantage of the resulting increase in signal-to-noise ratio, the coefficient processor can generate offset and gain normalization coefficients with greater precision than the precision of the detector output data, allowing the detector normalization circuit to generate normalized detector data also having greater precision than the detector output data.

In more specific aspects of the invention, a normalization circuit is used in an exemplary thermal imaging system having an array of thermal radiation detectors. The detector array is caused to periodically scan two separate thermal references, providing corresponding detector reference responses to the system processor, which performs the coefficient processing function. Using a conventional averaging analysis, the processor reduces random noise effects, and increases signal-to-noise ratio, enabling the gain and offset normalization coefficients to be computed with greater precision than the detector output data.

The normalization circuit receives 12-bit detector data from the detector array, and outputs 15-bit normalized detector data (representing a 3-bit increase in precision), using 16-bit gain and offset normalization coefficients. For each detector, an offset addition operation adds to the 12-bit detector data the 12 MSB of the corresponding offset coefficient. After the offset addition operation, the 4 LSB of the offset coefficient are concatenated to obtain offset-corrected detector data with correspondingly increased precision. After a $16 \times 15$ gain multiplication operation completes the m $(x+b)$ normalization using the corresponding gain normalization coefficient, bits representing unnecessary precision are discarded, and a final clipping operation yields normalized detector data of the desired precision (15 bits).

The technical advantages of the invention include the following. The normalization system uses offset and gain normalization coefficients that are continuously updated in real time to accommodate nonuniform changes in detector response during operation. Using a noise-reduction averaging analysis of the detector output data, offset and gain normalization coefficients can be computed with greater precision than the detector output data. The dynamically updated normalization approach of the invention is readily adaptable to general signal processing applications using detector data input.

BRIEF DESCRIPTION OF THE DRAWINGS

For a more complete understanding of the present invention, and for further features and advantages, reference is now made to the following Detailed Description, taken in conjunction with the accompanying Drawings, in which.

DETAILED DESCRIPTION OF THE INVENTION

The Detailed Description of the preferred embodiment of a detector normalization circuit and method is organized as follows:

1. Thermal Detector Response
2. Functional Description
3. Circuit Description
3.1. Signal Input/Output
3.2. Detector Normalization Circuit
4. Operation
4.1. Coefficient Update
4.2. Detector Normalization
5. Conclusion The preferred embodiment of the invention is described in relation to an exemplary detector normalization application for a thermal imaging system in which the detector normalization circuit is used to normalize 12-bit thermal image scene data from a focal plane array of detectors to obtain 15-bit normalized detector data. The thermal imaging system includes a thermal detection subsystem that generates successive frames of 12-bit digitized detector samples, or pixels, that are transmitted to the normalization circuit. The thermal detection subsystem includes thermal reference means for causing the detector array to periodically scan two thermal reference sources, generating corresponding 12-bit detector reference samples that are transmitted to the thermal imaging system's signal processor (which performs a coefficient processing function).

While the Detailed Description is in relation to an exemplary thermal detector normalization application, the detector normalization system of this invention has generalized applicability to signal processing systems that process detector data.

1. Thermal Detector Response. For the exemplary thermal detector normalization application, a comparison of ideal and actual detector array response to two thermal reference sources is illustrated in FIGS. 1a and 1b.

Figure 1A:
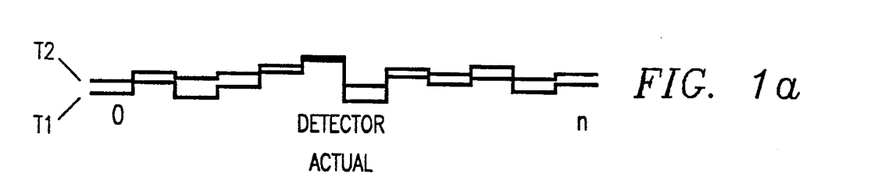
FIGS. 1a–1b respectively illustrate ideal and actual detector array responses to thermal reference sources.

FIG. 1a illustrates, for an array of n detectors, the ideal responses that would be obtained from scanning two thermal reference sources, T1 and T2. Thus, each of the n detectors would provide a detector output corresponding to temperature T1 for the T1 source, and a detector output corresponding to temperature T2 for the T2 source. In particular, ideal detectors would provide uniform outputs, with identical gain (i.e., the detector output difference between thermal references T1 and T2) and zero offset (i.e., the difference between the detector response and the actual thermal reference).

Figure 1B:
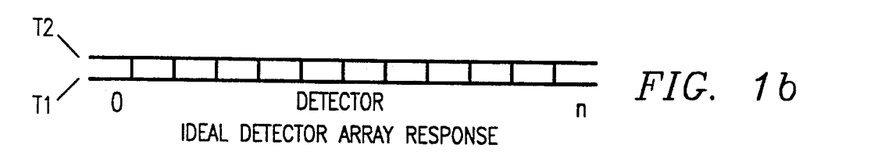

FIG. 1b illustrates the more realistic actual response of the array of n detectors to the thermal reference sources T1 and T2. In this case, detector-to-detector nonuniformities, such as those caused by discrepancies in materials and/or fabrication processes, cause the detector-to-detector output response to be nonuniform and unpredictable.

In particular, each detector response to a thermal reference source has a different characteristic gain and offset (i.e., detector response is nonuniform both in terms of offset and gain). Moreover, as described in the Background, detector performance changes nonlinearly with time and operational environment, introducing additional detector nonuniformities.

The detector normalization approach of the invention uses the responses of each detector to two reference sources to compute offset and gain normalization coefficients that characterize detector output error. That is, the normalized response of the detector can be characterized by the normalization function m $(x+b)$, where b is the offset level and m is the gain factor.

Accordingly, to perform detector normalization accurately during detector operation, the detector array is caused to periodically scan the thermal reference sources providing detector reference response samples for each detector. For each scan, these detector reference responses are used to compute correcting offset and gain normalization coefficients.

These normalization coefficients are provided to the detector normalization circuit of the invention for use in normalizing actual scene data from the detector array according to the normalization function m (x+b). Preferably, for each normalization-coefficient update operation, computing updated normalization coefficients, and providing them to the detector normalization circuit, is accomplished during the fly-back period between thermal reference scan and image scan, so that the update operation occurs in real time.

Dynamically updating normalization coefficients provides increased accuracy for the detector normalization operation by reducing the affect of nonuniformities in detector performance as a function of time and operating environment. This normalization-coefficient update operation provides another mechanism for increasing detector output accuracy—using conventional noise-reduction averaging techniques, the scan-to-scan signal-to-noise ratio for the detector reference responses can be improved to provide greater precision for the detector normalization operation.

Specifically, for the exemplary application of the detector normalization circuit in a thermal imaging system, the thermal detectors provide a 12-bit detector response to incident thermal radiation—noise constraints prevent the detector array from providing detector output data with any greater precision. Using the real time normalization-coefficient update approach of the invention, noise is reduced by averaging a selected sequence of scan-to-scan detector responses to the thermal reference sources. The resulting increase in signal-to-noise ratio allows normalization gain and offset coefficients to be computed with 16-bit precision. This 16-bit precision for the normalization gain and offset coefficients allows the detector normalization circuit to achieve 15-bit normalized detector output precision.

Figure 2:
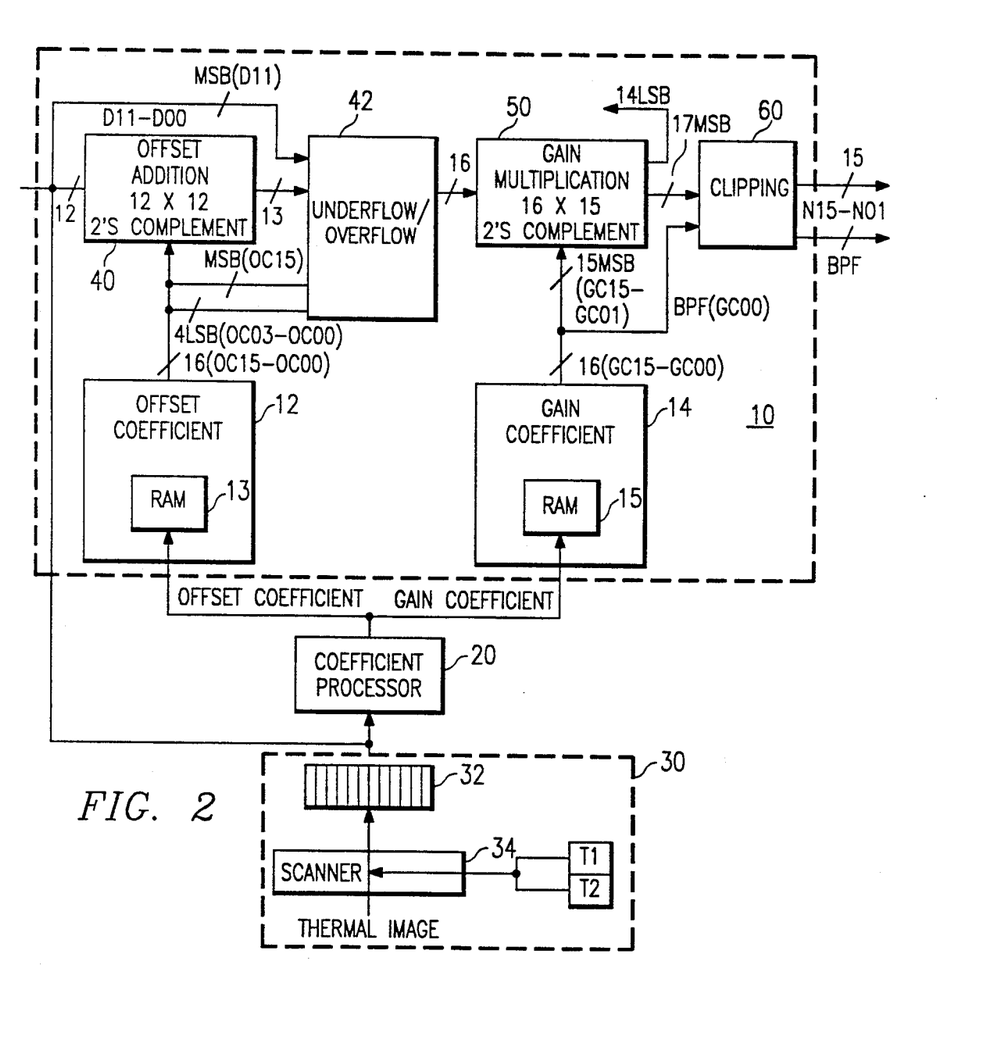
FIG. 2 is a general functional block diagram of an exemplary normalization system used in a thermal imaging application.

2. Functional Description. FIG. 2 is a general functional diagram for the detector normalization circuit of the invention. As described in Section 1, the detector normalization circuit implements the normalization function m (x+b) using offset (b) and gain (m) normalization coefficients that are continuously updated in real time.

The detector normalization circuit has two modes of operation—(a) coefficient update, and (b) detector normalization (using the updated coefficients). For the exemplary application in a thermal imaging system, the coefficient update operation is performed during the fly-back interval between completing a scan of the thermal reference sources and beginning a thermal image scan.

For the coefficient update operation, the detector normalization circuit 10 includes normalization offset coefficient logic 12 with an offset coefficient RAM 13, and normalization gain coefficient logic 14, with a gain coefficient RAM 15. Offset and gain normalization coefficients stored in respective RAMs 13 and 15 are updated continuously by a coefficient processing operation.

For the exemplary thermal imaging application, dynamic update of the gain and offset normalization coefficients is performed by the signal processor in the thermal imaging system—this function is represented in FIG. 2 as a coefficient processor 20. The designation "coefficient processor" is intended to be an entirely general functional designation. The coefficient processing function can be implemented in a number of ways, such as by a custom processor chip or as a task in a general system processor.

Thermal detection is performed by a thermal detection subsystem 30. The thermal detection subsystem includes a focal plane array 32 of thermal detectors, and a scanner 34.

In normal thermal imaging operation, the scanner scans the detector array across the image scene, generating standard 12-bit detector output data. At selected intervals, such as at the end of each complete thermal image scan, the scanner can be directed to scan the detector array across both of the thermal reference sources T1 and T2. In response to scanning the thermal reference sources, each detector of the detector array provides sources, each detector reference response samples corresponding 12-bit detector output data. At selected (one set of detector array samples associated with each thermal reference source). These detector reference responses are provided to the coefficient processor.

The coefficient processor computes the offset and gain normalization coefficients with 16-bit precision (i.e., 4 bits greater than the 12-bit precision achieved by the detectors). As discussed in Section 1, a conventional averaging analysis of a sequence of detector reference responses from each detector (i.e., multiple sets of detector array reference responses) is used to filter detector noise and achieve an improved signal-to-noise ratio for the detector reference responses, thereby allowing greater precision in computing the normalization coefficients.

After updated offset and gain coefficients are computed, they are transferred to the respective offset and gain coefficient RAMS 13 and 15 in the detector normalization circuit. During detector normalization operations, the updated coefficients are read-out in synchronism with the detector output data samples received from the thermal detector subsystem 30 (i.e., from the detector array in response to scanning an image scene).

For the detector normalization operation, detector normalization circuit 10 first performs an offset addition operation 40. This 12×12 2's complement addition operation adds to each input 12-bit 2's complement detector sample D11-D00 the 12 MSB of the normalization offset coefficient. The resulting offset addition value is concatenated with the 4 LSB of the offset normalization coefficient (representing the increase in precision provided by the coefficient processing operation). After an overflow/underflow clipping operation 42, a 16-bit (signed) offset-corrected detector sample is obtained.

A gain multiplication operation 55 performs a 16×15 2's complement multiplication of the 16-bit offset-corrected detector sample and the 15-MSB of the 16-bit gain normalization coefficient (the LSB of the gain coefficient is a bad pixel flag). For the exemplary thermal imaging application, the 14 LSB of the resulting 31-bit gain multiplication value represent unnecessary precision, and are discarded.

Finally, a clipping operation 60 clips the 17-bit offset/gain-corrected detector sample to provide the 15-bit 2's complement normalized detector sample output from the detector normalization circuit.

Selecting appropriate normalization coefficient update intervals is a design choice, subject to an assessment of the detector output nonuniformities manifested during detector operation. The recommended approach is to cause the scanner to scan the detector array across the thermal reference sources at the end of each thermal image scan. In this approach, the fly-back interval between the end of the thermal reference scan and the beginning of the next thermal image scan is used to compute the corresponding 16-bit offset and gain normalization coefficients, and to load these coefficients into the respective offset and gain coefficient RAMs 13 and 15. Thus, for each frame of scene data from a thermal image scan, updated offset and gain normalization coefficients are provided to the detector normalization circuit, effecting a real time normalization-coefficient update operation.

Figure 3:
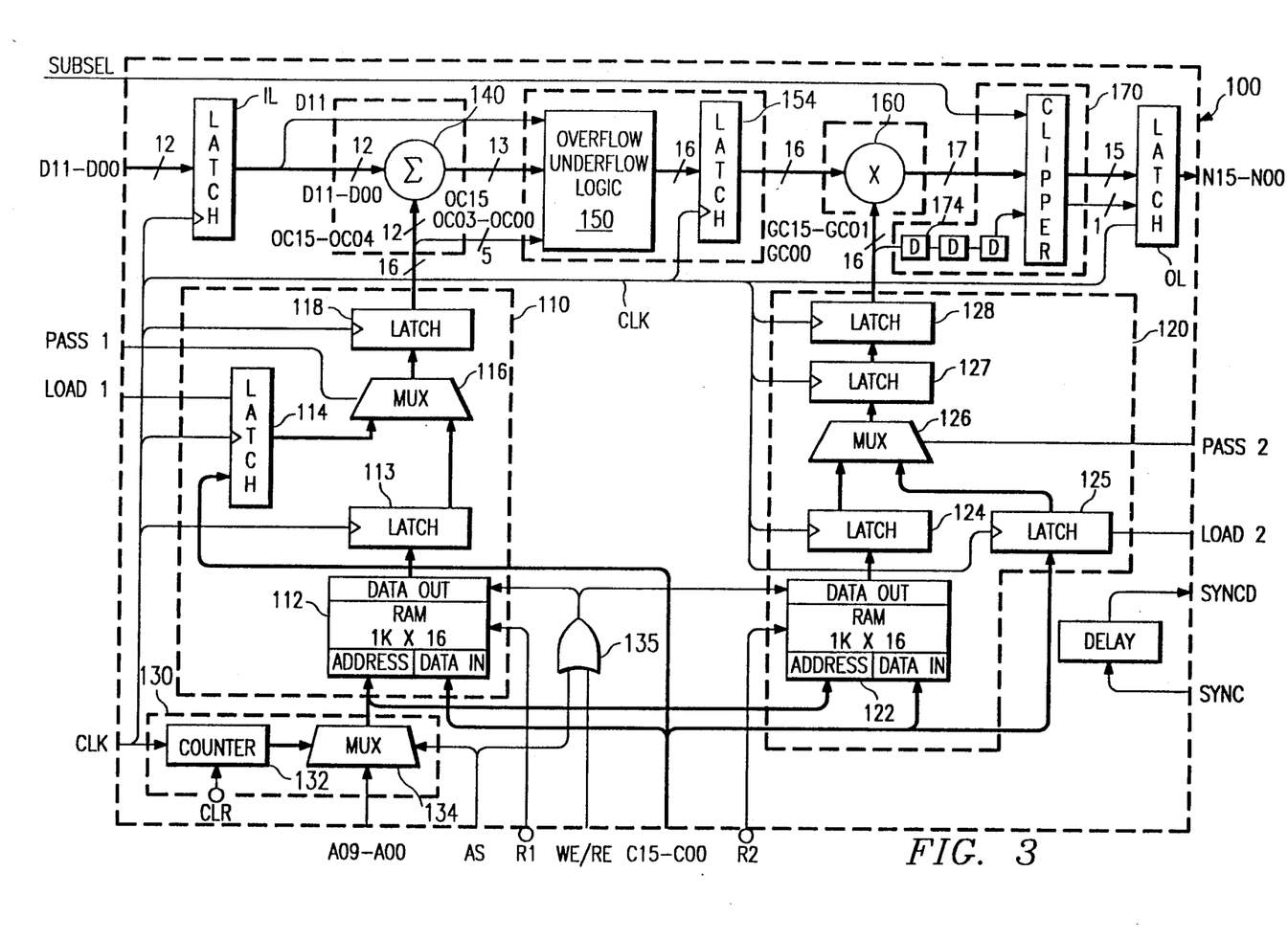
FIG. 3 is a schematic block diagram of the normalization circuit.

3. Circuit Description. FIG. 3 is a schematic block diagram of the detector normalization circuit of the invention, configured for the exemplary application of normalizing detector output in a thermal imaging system. Implementing the detector normalization circuit as an application specific integrated circuit (ASIC) is recommended.

3.1. Signal Input/Output. With reference to FIG. 3, the signal inputs to the detector normalization circuit for coefficient update and read-out operations are:

| Signal Name | Description |
| --- | --- |
| C15-C00 | Normalization coefficients to be loaded into respective offset/gain coefficient RAMs |
| AO9-AO0 | Address for externally addressing offset and gain coefficient RAMs |
| CLR | Reset the internal address counter to zero |
| WE/RE | WRITE/READ normalization coefficients into/from a respective coefficient RAM |
| AS | When active, selects internal addressing by the address counter; when inactive, selects external addressing AO9-AO0 |
| PASS1 | When active, selects a TEST offset coefficient loaded directly into a latch by the coefficient processor (used for test purposes) |
| PASS2 | When active, selects a TEST gain coefficient loaded directly into a latch by the coefficient processor (used for test purposes) |
| LOAD1 | When PASS1 is active, enables the latch that feeds the TEST offset coefficient |
| LOAD2 | When PASS2 is active, enables the latch that feeds the TEST gain coefficient |

The signal inputs to the detector normalization circuit for the detector normalization operations are:

| Signal Name | Description |
| --- | --- |
| D11-D00 | Two's complement input thermal detector data samples (pixels) to be normalized |
| SUBSEL | Selects pixel substitution -- when active, the bad pixel flag (identifying defective detectors) causes the data to be substituted with all zeros, or when inactive, the bad pixel flag is subtended to the 15-bit normalized detector data N15-N01 without data being altered |
| SYNC | Signal indicating that the input detector data D11-D00 is valid; must be pipeline delayed to accommodate the detector normalization operation |
| R1 | When active, enables the offset coefficient RAM for reading and writing; when inactive, the RAM is placed in a power-saver mode |
| R2 | When active, enables the gain coefficient RAM for reading and writing; when inactive, the RAM is placed in a power-saver mode |

The signal outputs from the detector normalization circuit are:

| Signal Name | Description |
| --- | --- |
| N15-N01 | 15-bit 2's complement normalized detector output data |
| N00 | Bad pixel flag which when set identifies defective detectors in the detector array -- stored in the coefficient processor and provided as the LSB of the 16-bit gain coefficient in the gain coefficient RAM, which is appropriately delayed and then output with the corresponding normalized (or zeroed) detector output data N15-N00 |
| SYNCD | Pipeline delayed SYNC signal |

In addition, an external clock CLK is used to clock all data transfer and latching operations for the detector normalization circuit. For typical ASIC implementations, CLK will have a maximum frequency of about 25 MHz.

3.2. Detector Normalization Circuit. The detector normalization circuit implements the exemplary detector normalization function for the thermal imaging system according to the transfer function:

$$CLIP2([CLIP1([[(D11-D00)+(OC15-OC04)]*2^4 +(OC03-OC00)])* ((GC15-GC00)*2^{-1})]*2^{-14})$$

CLIP1≡Overflow/Underflow Clipping
CLIP2≡Range Clipping

As shown in FIG. 3, detector normalization circuit 100 includes offset coefficient logic 110, gain coefficient logic 120 and addressing logic 130. The offset and gain coefficient logic stores the corresponding offset and gain normalization coefficients, which are read out during the detector normalization operations in synchronism with the receipt of thermal detector output data from the thermal detection subsystem.

Offset coefficient logic 110 includes an offset coefficient RAM 112—a 1K×16 RAM that stores a 16-bit (signed) offset normalization coefficient for each detector in the detector array. Offset coefficient RAM 112 receives addresses AO9-AO0 from the address data bus ADB, and offset coefficients from the coefficient processor over the coefficient data bus CDB. The offset coefficient RAM is enabled/disabled by the control signals R1 and WE/RE.

The offset coefficient output from the offset coefficient RAM 112 is applied to a latch 113. A latch 114 is used for TEST offset coefficients that can be supplied by the coefficient processor over the coefficient data bus CDB (when LOAD1 is active).

A multiplexer 116 is responsive to PASS1 to select either the offset normalization coefficient from the offset coefficient RAM 112 (through latch 113), or the TEST offset coefficient from the coefficient processor (through latch 114). The offset coefficient output from multiplexer 116 is applied to a latch 118.

The latches 113, 114 and 118 are clocked by CLK.

The gain coefficient logic 120 includes a gain coefficient RAM 122—a 1K×16 RAM that stores a 16-bit (signed) gain normalization coefficient for each detector of the focal plane array. Gain coefficient RAM 122 receives addresses AO9-AO0 over the address data bus ADB, and the gain coefficients from the coefficient processor over the coefficient data bus CDB. The gain coefficient RAM is enabled/disabled by the control signals R2 and WE/RE.

Gain coefficients output from gain coefficient RAM 122 are applied to a latch 124. A TEST gain coefficient can be supplied by the coefficient processor (over the coefficient data bus CDB) to a latch 125 (when enabled by LOAD2).

A multiplexer 126 is responsive to PASS2 to select either a gain normalization coefficient from the gain coefficient RAM 122 (through latch 124) or a TEST gain coefficient from the coefficient processor (through latch 125). The multiplexer output is applied through a latch 127 to a latch 128, which together provide an appropriate pipeline delay.

Latches 124, 125, 127 and 128 are clocked by CLK.

The internal addressing logic 130 is used to provide internal addresses to the offset coefficient and gain coefficient RAMs 112 and 122 in synchronism with the thermal detector output samples received by the detector normalization circuit. The addressing logic includes an internal address counter 132 and a multiplexer 134. Address counter 132 is cleared by CLR, and then clocked by CLK to provide sequential addresses to multiplexer 134. The multiplexer is responsive to AS to select either the internal address from address counter 132, or an external address AO9–A00 from the coefficient processor. The address output from multiplexer 134 is provided to the offset and gain coefficient RAMs 112 and 122 over the address data bus ADB.

External addressing is used during the coefficient update mode of operation to load offset and gain normalization coefficients into the respective offset and gain coefficient RAMs (which are write-enabled by AS through an OR gate 135). Internal addressing is used during the detector normalization mode of operation, to read out updated offset and gain normalization coefficients stored in respective RAMs (which are read-enabled by AS through the OR gate 135).

To implement detector normalization, detector normalization circuit 100 includes an offset adder 140 with underflow/overflow logic 150, and a gain multiplier 160 with output clipper logic 170. This logic performs detector normalization operations using the gain and offset normalization coefficients retrieved from the gain/offset coefficient logic 120/110 in synchronism with the receipt of detector output samples.

The 12-bit 2's complement thermal detector data samples D11–D00 from the detector array are clocked by CLK into an input latch IL.

Offset adder 140 receives a 12-bit detector sample D11–D00 and the 12 MSB of the corresponding 16-bit offset normalization coefficient OC15–OC04, and performs a 2's complement addition, providing a 13-bit offset addition value (12 bits plus a carry bit). The 4 LSB of the offset coefficient bypass the addition operation.

The 13-bit offset addition value from adder 140 and the 4 LSB of the offset coefficient are applied to overflow/underflow logic 150, which also receives the MS (sign) bits for both the detector data (D11) and the offset coefficient (OC15). Overflow/underflow logic 150 concatenates the 13-bit offset addition value and the 4 LSB of the offset coefficient, and performs a conventional overflow/underflow operation that limits the output from the offset addition operation to 16 bits (preventing inadvertent wrap-around). The resulting 16-bit 2's complement offset-corrected detector data is clocked by CLK into a latch 154.

The 16-bit offset-corrected detector sample from latch 154 is input to gain multiplier 160, which also receives the 15 MSB of the corresponding 16-bit gain normalization coefficient GC15–GC1 (the LSB of the gain coefficient is the bad pixel flag). Gain multiplier 160 performs 16×15 2's complement multiplication. The LS 14 bits of the multiplication represent unnecessary precision for the exemplary thermal imaging application, and are discarded, leaving a 17-bit output from the multiplier.

Clipper 170 receives the 17-bit offset/gain-corrected detector data, along with the bad pixel flag GCOO (i.e., the LSB of the gain coefficient) through an appropriate delay 174, and SUBSEL. Clipper 170 performs a conventional clipping operation to provide 15-bit (signed) normalized detector data.

The 15-bit normalized detector data is clocked by CLK into an output latch OL (along with the bad pixel flag), which interfaces to a normalized data bus N15–N00.

4. Operation. The two modes of operation of the detector normalization circuit—(a) coefficient update, and (b) detector normalization with coefficient read-out—are executed under control of the coefficient processor and CLK.

4.1. Coefficient Update. With reference to FIG. 3, the coefficient update operation is used to load offset and gain normalization coefficients into respective offset and gain coefficient RAMs 112 and 122, for read-out during detector normalization operations in synchronism with the detector output data received from the thermal detection subsystem. In an alternate test mode, TEST offset and gain coefficients can be provided directly from the coefficient processor, bypassing the gain and offset coefficient RAMs. Synchronization is controlled by CLK.

A coefficient update operation is initiated by the coefficient processor, which sets the RAMs in the write-enable mode using WE/RE, and selects external addressing using the AS line. The updated offset and gain coefficients are transmitted serially over the coefficient data bus CDB, with the corresponding external memory addresses AO9–AOO being applied through multiplexer 134 to the offset and gain coefficient RAMs. When a separate offset and gain coefficient for each thermal detector of the detector array has been loaded, the detector normalization circuit is ready for normalizing the detector data from the next thermal image scan.

4.2. Detector Normalization Operation. With reference to FIGS. 2 and 3, for the exemplary thermal imaging application, the detector normalization circuit normalizes input 12-bit 2's complement detector data D11–DOO, providing corresponding normalized detector data N15–NOO with 15-bit precision (i.e., 15 bits of normalized detector data N15–NO1 and a bad pixel flag NOO).

The detector normalization operation is synchronized by CLK with the read-out of the offset and gain normalization coefficients. That is, for each detector sample clocked into input latch IL, a corresponding offset coefficient is clocked into latch 118, and a corresponding gain coefficient is clocked into latch 127 (and then into latch 128 on the next clock cycle).

During detector normalization operations, internal addressing controls offset/gain coefficient read-out. At the beginning of a frame of detector output data, the address counter 132 is cleared by CLR, the AS line is switched to select internal addressing, and the offset and gain coefficient RAMs 112 and 122 are set in the read-enable mode by WE/RE. Clocked by CLK, address counter 132 provides sequential addresses (through multiplexer 134) over the address data bus ADB to the offset and gain coefficient RAMs 112 and 122. The addressed offset and gain coefficients are clocked into respective latches 113 and 124. The offset normalization coefficient in latch 113 is selected by multiplexer 116 (PASS1 inactive) and clocked into latch 118 for presentation to the offset adder 140. The gain normalization coefficient in latch 124 is selected by multiplexer 126 (PASS2 inactive) and clocked into latch 127. On the next clock cycle, the gain coefficient is clocked into latch 128 (providing a one clock cycle delay to accommodate the offset addition operation) and presented to the gain multiplier 160.

The alternate test operation permits the coefficient processor to feed TEST offset and gain coefficients directly to the offset adder 140 and gain multiplier 160. The coefficient processor provides the TEST offset and gain coefficients over the coefficient data bus CDB to respective latches 114 and 125, which are enabled for input on the next clock cycle by switching LOAD1 and LOAD2 active. Multiplexers 116 and 126 select the TEST offset and gain coefficients in latches 114 and 125 in response to PASS1 and PASS2 being switched active.

The offset addition operation 40 performs a 12×12 2's complement addition of the input 12-bit 2's complement detector data sample D11-D00 and the 12 MSB of the associated offset coefficient OC15-OC04 from latch 118. The 4 LSB of the offset coefficient OC03-OC00, representing increased precision provided by the coefficient processing operation described in Section 1, bypass the offset addition operation. The offset addition result is 13 bits (12 bits plus a carry-out bit).

The overflow/underflow operation 42 takes care of any overflow or underflow conditions from the offset addition operation 40. The 13-bit precision of the offset addition result is increased by concatenating the 4 LSB of the offset coefficient OC03-OC00—the overflow/underflow operation affects the higher precision 17-bit offset addition value. Because both the detector data D11-D00 and the offset normalization coefficient OC15-OC00 are signed, the overflow/underflow operation takes into account both sign bits (D11 and OC15). Based on the 17-bit offset addition value and the 2 sign bits, the overflow/underflow operation provides 16-bit 2's complement offset-corrected detector data, preventing any undesired wrap-around resulting from overflow/underflow conditions.

The gain multiplication operation 50 multiplies the 16-bit 2's complement offset detector output data by the 15 MSB of the associated 16-bit (signed) gain normalization coefficient from latch 128. The LSB GC00 of the gain coefficient is the bad pixel flag, which is not used in the gain multiplication operation. For the exemplary thermal imaging application, the 31-bit multiplication result contains unnecessary precision. Specifically, the 14 LSB of the multiplication result can be discarded. The result is a 17-bit 2's complement offset/gain-corrected detector data value.

In the final clipper operation 60, the 17-bit offset/gain-corrected detector data is clipped to provide the desired 15-bit 2's complement normalized detector data that is latched into output latch OL. That is, in accordance with conventional clipper operation, 15-bit values greater than 3FFF hexadecimal are assigned a value of 3FFF, while values less than C000 are assigned a value of C000.

Alternatively, if SUBSEL is active, indicating a substitution condition, then if the bad pixel flag OC00 is set, the clipper operation effects a substitution by providing a 15-bit all-zero output. Otherwise, if the bad pixel flag is not set, it is subtended to the unsubstituted 15-bit normalized detector data.

The detector normalization operation performed by the detector normalization circuit of the invention provides a 16-bit output N15-N00 comprising 15-bit 2's complement normalized detector data and the bad pixel flag.

4.3. Timing. The timing conditions associated with the detector normalization operation described in Section 4.2 can be summarized as follows. On the rising clock edge of CLK, the following events occur:

(a) All latches are clocked;
 (b) The address counter increments by 1;
 (c) Offset addition is performed to add the input detector sample and the associated offset coefficient;
 (d) The offset addition result is checked for overflow/underflow;
 (e) Gain multiplication is performed to multiply the offset addition result by the associated gain coefficient; and
 (f) The resulting offset/gain-corrected data is clipped to provide 15-bit normalized detector data.

Completing these events in one clock cycle of the exemplary 25 MHz clock would require that the following operations be completed in about 40 nsec:

(a) Set up inputs to latches, set up an address to the offset and gain coefficient RAMs, and output valid data from the RAMs;
 (b) Complete a 2's complement offset addition, check for overflow/underflow, and set up for input to a latch; and
 (c) Complete a 2's complement gain multiplication, perform range clipping and set up for input to the output latch.

5. Conclusion. The detector normalization circuit of the invention implements an m (x+b) normalization function using offset and gain normalization coefficients derived from the periodic responses of a detector array to two reference sources. The offset and gain coefficients are dynamically updated at regular intervals, permitting continuously accurate normalization of the detector data. By averaging detector responses to successive reference scans, the signal-to-noise ratio for the detector reference responses can be improved to permit computation of offset and gain coefficients with greater precision than the precision of the detector output data, thereby enabling the normalized detector data from the detector normalization circuit to be of greater precision than the detector output data.

Although the present invention has been described with respect to a specific, preferred embodiment, various changes and modifications may be suggested to one skilled in the art, and it is intended that the present invention encompass such changes and modifications as fall within the scope of the appended claims.

What is claimed is:

1. A normalization system for normalizing detector output signals from a detector, comprising:
 reference means for causing the detector to detect a reference source at selected update intervals, such that the detector generates corresponding detector reference signals that exhibit offset and gain errors representative of the detector output;

a coefficient processor that, each update interval, is responsive to said reference signals for generating corresponding offset and gain coefficients that respectively correct offset and gain errors in said reference signals;

said coefficient processor computing gain and offset coefficients with greater precision than the precision of the detector output signals;

offset addition logic synchronized with the detector output signals for adding to each detector output signal said corresponding offset coefficient to obtain an offset value;

gain multiplication logic synchronized with the detector output signals for multiplying the offset value by said corresponding gain coefficient; and synchronization logic for synchronizing said offset addition and gain multiplication operations;

such that the normalization system outputs a normalized detector signal with greater precision than the detector output signal received by the normalization system, and for which offset and gain errors are corrected in accordance with the normalization function represented by said offset and gain coefficients.

2. The normalization system of claim 1, wherein the detector is an array of multiple detectors, and wherein:

for each update interval, each detector generates a corresponding reference signal that exhibits associated gain and offset errors;

for each update interval, said coefficient processor generates for each detector corresponding gain and offset coefficients; and for each detector, said offset addition and gain multiplication logic are synchronized with the detector array output signals to perform respective offset addition and gain multiplication operations using the corresponding offset and gain coefficients for each detector.

3. The normalization system of claim 2, further comprising:

coefficient logic for storing said offset and gain coefficients for each detector, and for providing said coefficients to said offset addition and gain multiplication logic in synchronism with the detector output signals received by the normalization system;

said coefficient processor providing updated offset and gain coefficients for each detector to said coefficient logic each time such coefficients are computed in response to detector reference signals output by the detectors during an update interval.

4. The normalization system of claim 3, further comprising:

addressing logic for providing coefficient addresses for corresponding offset and gain coefficients in synchronism with the detector output signals;

said coefficient logic being responsive to said coefficient addresses to provide said offset and gain coefficients.

5. The normalization system of claim 4, wherein said coefficient logic comprises:

offset coefficient logic, including offset coefficient storage for storing said offset coefficients, for providing said stored offset coefficients to said offset addition logic; and gain coefficient logic, including gain coefficient storage for storing said gain coefficients, for providing said stored gain coefficients to said gain multiplication logic.

6. The normalization system of claim 1, wherein said coefficient processor computes offset and gain coefficients by averaging detector reference signals from a selected number of update intervals, using the result of such averaging to filter noise and increase signal-to-noise ratio, thereby enabling said coefficient processor to compute said offset and gain coefficients with greater precision than the detector output signals.

7. The normalization system of claim 6, wherein, after offset addition and gain multiplication, data bits representing unnecessary precision are discarded, providing an output normalized detector signal of a selected precision.

8. A thermal detector normalization system for normalizing detector output signals from an array of thermal radiation detectors, comprising:

reference means for causing the detectors of the array to detect at least two thermal reference sources at selected update intervals, such that each detector generates corresponding detector reference signals that exhibit offset and gain errors representative of detector output;

a coefficient processor responsive each update interval to said reference signals for generating corresponding offset and gain coefficients for each detector that respectively correct offset and gain errors in said reference signals;

said coefficient processor computing gain and offset coefficients with greater precision than the precision of the detector output signals;

offset addition logic synchronized with the detector output signals for adding to each detector output signal said corresponding offset coefficient; and gain multiplication logic synchronized with the detector output signals for multiplying each detector output signal by said corresponding gain coefficient;

such that the normalization system outputs a normalized detector signal for each detector with greater precision than the detector output signal received by the normalization system, and for which offset and gain errors being corrected in accordance with the normalization function represented by said offset and gain coefficients.

9. The thermal detector normalization system of claim 8, further comprising:

coefficient logic for storing said offset and gain coefficients for each detector and for providing those coefficients to said offset addition and gain multiplication logic in synchronism with the detector output signals received by the thermal detector normalization system;

said coefficient processor providing updated offset and gain coefficients for each detector to said coefficient logic each time such coefficients are computed in response to detector reference signals output by the detectors during an update interval.

10. The thermal detector normalization system of claim 9, further comprising:

addressing logic for providing coefficient addresses for corresponding offset and gain coefficients in synchronism with the detector output signals;

said coefficient logic being responsive to said coefficient addresses to provide said offset and gain coefficients.

11. The thermal detector normalization system of claim 10, wherein said coefficient logic comprises:
    offset coefficient logic, including offset coefficient storage for storing said offset coefficients, for providing said stored offset coefficients to said offset addition logic; and
    gain coefficient logic, including gain coefficient storage for storing said gain coefficients, for providing said stored gain coefficients to said gain multiplication logic.

12. The thermal detector normalization system of claim 8, wherein said coefficient processor computes offset and gain coefficients by averaging detector reference signals for each detector over a selected number of update intervals, using the result of such averaging to filter noise and increase signal-to-noise ratio for the detector reference signals, thereby enabling said coefficient processor to compute said offset and gain coefficients with greater precision than the detector output signals.

13. The thermal detector normalization system of claim 12, wherein, after offset addition and gain multiplication, data bits representing unnecessary precision are discarded, providing an output normalized detector signal of a selected precision.

14. A method of detecting selected phenomena for normalizing detector output from a detector, comprising:
    (a) detecting a reference source with a detector at selected update intervals;
    (b) generating detector reference signals from the detector at the selected update intervals that exhibit offset and gain errors representative of detector output;
    (c) transmitting the detector reference signals to a coefficient processor;
    (d) in response to said reference signals generated at each update interval, computing corresponding offset and gain coefficients in the coefficient processor for the detector with greater precision than the precision of the detector output signals that respectively correct offset and gain errors in said reference signals;
    (e) adding in adding circuitry to each detector output signal said corresponding offset coefficient to obtain an offset value; and
    (f) multiplying the offset value by said corresponding gain coefficient in a multiplier to provide a normalized detector signal output from the detection system that has greater precision than the detector output signal, and for which offset and gain errors are corrected in accordance with the normalization function represented by said offset and gain coefficients.

15. The method of detector normalization of claim 14, wherein the detector is an array of detectors, further comprising the steps:
    storing offset and gain coefficients for each detector, which are updated each update interval;
    providing such coefficients for offset addition and gain multiplication in synchronism with the detector output signals.

16. The method of detector normalization of claim 15, further comprising the step:
    providing coefficient addresses for corresponding offset and gain coefficients in synchronism with the detector output signals;
    and gain coefficients being provided in response to said coefficient addresses.

17. The method of detector normalization of claim 14, wherein the step of computing offset and gain coefficients comprises the steps:
    averaging detector reference signals for the detector from a selected number of update intervals;
    using the result of such averaging to filter noise and increase signal-to-noise ratio for the detector; and
    computing said corresponding offset and gain coefficients with greater precision than the detector output signals.

18. The method of detector normalization of claim 17, further comprising the step:
    after offset addition and gain multiplication, discarding data bits representing unnecessary precision, and providing an output normalized detector signal of a selected precision.

* * * * *